(12) United States Patent
Brigdeman et al.

(10) Patent No.: US 8,715,385 B2
(45) Date of Patent: May 6, 2014

(54) BEARING MATERIAL

(75) Inventors: Raymond Brigdeman, Ayrshire (GB); Janette Johnston, Central Scotland (GB)

(73) Assignee: MAHLE International GmbH, Stuttgart (DE)

( * ) Notice: Subject to any disclaimer, the term of this patent is extended or adjusted under 35 U.S.C. 154(b) by 96 days.

(21) Appl. No.: 12/998,740

(22) PCT Filed: Nov. 25, 2009

(86) PCT No.: PCT/EP2009/008380
§ 371 (c)(1), (2), (4) Date: Aug. 3, 2011

(87) PCT Pub. No.: WO2010/060604
PCT Pub. Date: Jun. 3, 2010

(65) Prior Publication Data
US 2011/0286875 A1    Nov. 24, 2011

(30) Foreign Application Priority Data

Nov. 26, 2008 (GB) .................................. 0821593.1

(51) Int. Cl.
| C22C 9/00 | (2006.01) |
| C22C 9/02 | (2006.01) |
| B22F 3/12 | (2006.01) |
| B22F 3/16 | (2006.01) |
| B22F 7/04 | (2006.01) |

(52) U.S. Cl.
USPC ........ 75/247; 75/235; 419/8; 419/19; 419/28; 419/55; 428/553

(58) Field of Classification Search
USPC ........... 75/232, 235, 247; 428/553; 419/8, 19, 419/28, 55
See application file for complete search history.

(56) References Cited

U.S. PATENT DOCUMENTS

| 2,831,243 | A | * | 4/1958 | Thomson ........................ 75/233 |
| 2,845,918 | A | | 8/1958 | Goodzeit |
| 4,941,919 | A | | 7/1990 | Asada et al. |
| 5,137,792 | A | | 8/1992 | Hodes et al. |
| 2003/0173000 | A1 | | 9/2003 | Sakai et al. |
| 2003/0209103 | A1 | | 11/2003 | Takayama et al. |
| 2004/0161625 | A1 | * | 8/2004 | Sakai et al. ................... 428/553 |

FOREIGN PATENT DOCUMENTS

| GB | 1 189 279 | 4/1970 |
| GB | 2 355 016 | 4/2001 |
| GB | 2 384 007 | 7/2003 |

OTHER PUBLICATIONS

International Search Report of PCT/EP2009/008380 dated Apr. 7, 2010.
Written Opinion of the International Searching Authority dated Apr. 7, 2010 in PCT/EP2009/008380.
British Search Report of GB 0821593.1 dated Dec. 23, 2008.

* cited by examiner

*Primary Examiner* — George Wyszomierski
*Assistant Examiner* — Ngoclan T Mai
(74) *Attorney, Agent, or Firm* — Collard & Roe, P.C.

(57) ABSTRACT

A bearing material and a method for the manufacture of a bearing having a lining of the bearing material is described, the bearing material comprising: in wt %: 4-12 tin; 0.1-2 nickel; 1-6 bismuth; 0.01-less than 0.10 alumina; balance copper apart from incidental impurities.

6 Claims, 1 Drawing Sheet

BEARING MATERIAL

CROSS REFERENCE TO RELATED APPLICATIONS

Figure 1:
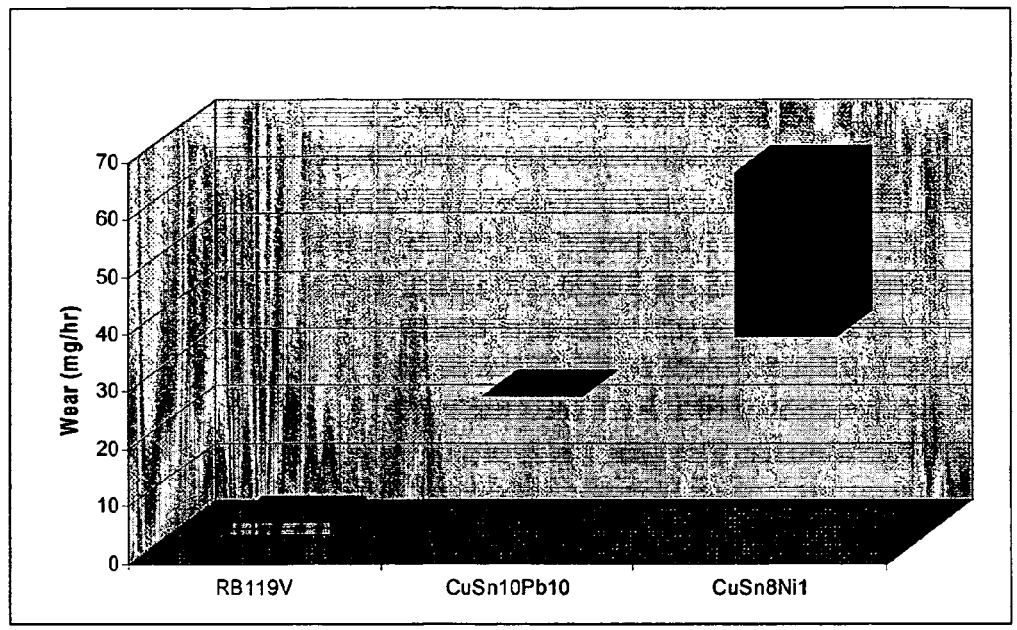

This application is the National Stage of PCT/EP2009/008380 filed on Nov. 25, 2009, which claims priority under 35 U.S.C. §119 of United Kingdom Application No. 0821593.1 filed on Nov. 26, 2008, the disclosure of which is incorporated by reference. The international application under PCT article 21(2) was published in English.

The present invention relates to a copper-based bearing material suitable, inter alia, for plain bearings such as bushes, for example, for internal combustion engines.

In some applications of bushes in machinery and especially internal combustion engines, the environment may be very harsh in terms of high temperatures, high loads and wear rates and corrosion. One such application may be rocker bushes, for example, in the cylinder heads of high duty diesel engines. Depending upon the precise service conditions of any particular application the bushes may be prone to a particular form of deterioration. In rocker bushes which support the valve actuating rockers in the engine cylinder head one form of deterioration which is prevalent is that of relatively very high wear rates. The problem of high wear rates in diesel engines is exacerbated by the particulate concentrations derived from burnt fuel finding their way into the lubricating oil. In order to overcome the problem of high wear rates in the rocker bushes some engine manufacturers have used bushes having very hard coatings on the sliding surface which whilst reducing the wear rate of the bushes per se can have unwanted wear effects on the co-operating surface of the rocker shaft itself. Furthermore, such coated bushes are very expensive, a typical six cylinder, 12-valve engine requiring twelve bushes.

GB 2 384 007 A describes a multi-layered sliding bearing having a copper-based bearing material layer produced by sintering of a powder onto a strong backing layer strip such as steel. This material has a composition which may comprise in wt %: 1-11 tin; not more than 0.2 phosphorus; not more than 10 in total of nickel and silver; not more than 25 in total of lead and bismuth; not more than 15 volume % in total of hard particles and high melting point particles; and/or up to 10 volume % solid lubricant. Whilst the hard particles and solid lubricant may be alternative additions and are not mandatory, the prospect of having a hard particle content of up to 15 volume % would, if utilised, lead to very undesirable characteristics in the bearing material so produced. Firstly, such high hard particle content would be likely to cause inter alia: high wear rates in the types of metal counterfaces commonly used in engine construction; produce a brittle material lacking in ductility; and, also produce high wear rates in factory production tooling used to process and form bearing from strip having such a composition.

U.S. Pat. No. 4,941,919 describes a copper-based sliding material and a method for its manufacture. In this document alumina contents of 0.1 to 7 wt % together with graphite in the range of 1 to 10 wt % are employed in the copper-based alloy matrix. However, the alumina is combined with the copper by mechanical mixing means such as ball milling whereby the alumina particles and the copper particles are initially bonded together prior to a sintering step in order to prevent the alumina particles from becoming separated from the copper matrix under boundary lubricating conditions. Furthermore, the combined copper and alumina powder are mixed with graphite powder prior to spraying the combined copper-alumina-graphite powder onto a substrate such as steel for example. Disadvantages of this material include the facts that: the copper and alumina combining step can take up to 24 hours or more and is therefore expensive; the graphite weakens the structure; and there is too much alumina present in the structure which embrittles the material, especially in the presence of graphite, and causes very high wear rates to tooling used to process the material into bearings.

It is an object of the present invention to provide an economic material having superior wear resistance for applications where high wear and seizure resistance are required without at least some of the disadvantages of prior art materials.

According to a first aspect of the present invention there is provided a bearing material comprising: in wt %: 4-12 tin; 0.1-2 nickel; 1-6 bismuth; 0.01-less than 0.10 alumina; balance copper apart from incidental impurities.

A preferred composition range comprises in wt %: 7-9 tin; 0.5-1.5 nickel; 2-5 bismuth; 0.03-0.07 alumina; balance copper apart from incidental impurities.

It is preferred that the bearing material according to the present invention is lead-free.

In this specification the term "lead-free" means that there is no intentional addition of lead apart from any impurity which may inadvertently be present in the basic melt stock from which the copper-based alloy material may originate.

A typical composition may comprise tin 8; nickel 1; bismuth 3.3; alumina 0.05; copper balance apart from incidental impurities.

According to a second aspect of the present invention there is provided a method of manufacturing a bearing, the method comprising the steps of: making a powder having a composition in wt % lying in the ranges 4-12 tin; 0.1-2 nickel; balance copper apart from incidental impurities; making a powder mixture comprising said copper-tin-nickel powder with bismuth powder and alumina powder to give an overall composition lying in the range in wt % of 4-12 tin; 0.1-2 nickel; 1-6 bismuth; 0.01-less than 0.1 alumina; balance copper apart from incidental impurities; spreading said powder mixture onto a strong backing material; sintering said bearing material powder mixture to the strong backing material; consolidating said sintered bearing material; resintering said consolidated bearing material; and, forming a bearing from said resintered material.

The bearing material according to the present invention may be produced by a known sintering process. A basic copper-based alloy comprising the copper, tin and nickel constituents may be made by a conventional melting and alloying process and the molten alloy so produced may be atomised to produce a powder of the required alloy composition. The powder may be sieved and divided up into predetermined fractions comprising specific powder particle size ranges. Powders of the actual bearing alloy composition may then be produced by mixing the atomised powder with bismuth powder and alumina powder. This mixed powder may then be spread onto a strip of a strong backing material and passed through a sintering furnace under a protective/reducing atmosphere in a first sintering step to bond the powder particles to each other and to the strong backing strip. The material at this stage comprises a high degree of porosity and it is necessary to compact the copper-based bearing alloy layer to remove the majority of porosity by passing the first sintered material through a rolling mill, for example. Following the compaction step, the material may again be passed through a sintering furnace for a second sintering step to further consolidate the copper-based bearing alloy layer itself and also to improve the bond of the bearing alloy layer to the backing strip.

The composition ranges of the constituents of the bearing alloy layer are formulated for the following reasons.

Tin

Tin alloys with the copper matrix to form a tin-bronze material having high strength, wear and corrosion resistance. Below the lower limit of 4 wt % tin the strength is inadequate to produce the required strength and durability whilst above 12 wt % the matrix of the bearing alloy layer becomes too hard for its intended bearing application and also there is a tendency for the material to become brittle at too high a tin content.

Nickel

Nickel whilst having a beneficial effect on increasing the strength of the matrix also has an effect of improving the corrosion resistance of the bearing alloy. Modern diesel engine lubricating oils contain sulphur and at the relatively high temperatures attained in an engine during service can form highly corrosive constituents in the oil which is pumped around the engine and into the bearing space between the bearing sliding surface and a shaft counterface, for example. The nickel range in the present alloy is intended to provide an improvement in corrosion resistance at the lower end whilst not being too high at the upper end to cause problems with respect to too high a hardness and/or brittleness, for example.

Bismuth

The bismuth content is a soft phase which remains substantially as elemental bismuth contained in the copper-based alloy matrix in what were the interstices between powder particles at the first sinter step. The purpose of the bismuth is to endow the material with greatly improved seizure resistance and also to improve the conformability of the bronze matrix.

Preferably, the size of the bismuth particles when added to the initial powder mixture is a maximum of 60 μm.

Alumina

Alumina has been found to greatly increase the wear resistance of the bearing material according to the present invention. Alumina contents of up to 3 wt % have been tested and found to endow the bearing material with greatly improved wear resistance compared with the base metal alloy composition. However, such levels of alumina can in some circumstances be abrasive to the counterface against which the bearing material sliding surface is running and also produces high wear rates in the tooling used to process the strip material into bearings which leads to greater expense and reduced accuracy of bearing forming.

Whilst alumina contents of 3 wt % have been utilised it has surprisingly been found that alumina contents in the region of 0.05 wt % and less produce reductions in wear rate comparable to alumina contents in the region of 3 wt %. Furthermore, relatively very low contents of alumina in the region of 0.05 to less than 0.1 wt % do not require the expensive and tedious combining steps of prior art materials since the relatively low alumina content does not render the particles prone to being separated from the copper-based matrix.

It has been found that powder mixtures may be made by ordinary mixing in rotating mixers without the need for mechanical alloying methods such as ball-milling and the like. The powder mixture so formed is perfectly amenable to spreading onto the substrate strip by conventional powder spreading dies followed by sintering of the loose powder and further processing as described above.

Conventionally, workers have viewed the use of alumina as being responsible for an intrinsic improvement in the wear rate of bearing materials per se. However, whilst not wishing to be bound by any particular theory, it is believed that the mechanism of wear rate reduction is somewhat more subtle. The low levels of alumina are believed to exert a gentle polishing action on the journal counterface rendering the counterface itself smoother and consequently less abrasive to the bearing surface.

Thus, the alumina content may be in the range from 0.01 to less than 0.1 wt % and preferably in the range from 0.03 to 0.07 wt % for the reasons discussed above.

The form of the alumina powder may preferably be fused alumina having particles of high density, low porosity, low permeability and high refractoriness. The particle size may be in the range from 8-19 μm (50% value) (3-32 μm 90% value) but more preferably the particle size range may be 11-14 μm (50% value) (5-25 μm 90% value), the 50% and 90% denotations meaning that 50% and 90% of particles lie within the specified range, respectively. According to a third aspect of the present invention there is provided a bearing when having a bearing functional lining made from the bearing material according to the first aspect of the present invention is bonded to a strong backing material.

The strong backing material may be any that is known in the art and may comprise steel or bronze, for example.

Although intended primarily for applications such as wrapped bushes for rockers or connecting rod small-end bushes, for example, it is envisaged that the bearing material of the present invention may be utilised for half bearing applications for crankshaft bearings, for example, but with a soft metal coating on the sliding surface. Such soft metal coating based on tin and tin alloys, for example, are well known in the bearings art and commonly known as overlay coatings. Such coatings fulfil the required functions of conformability and dirt embedability in a bearing.

Figure 2:
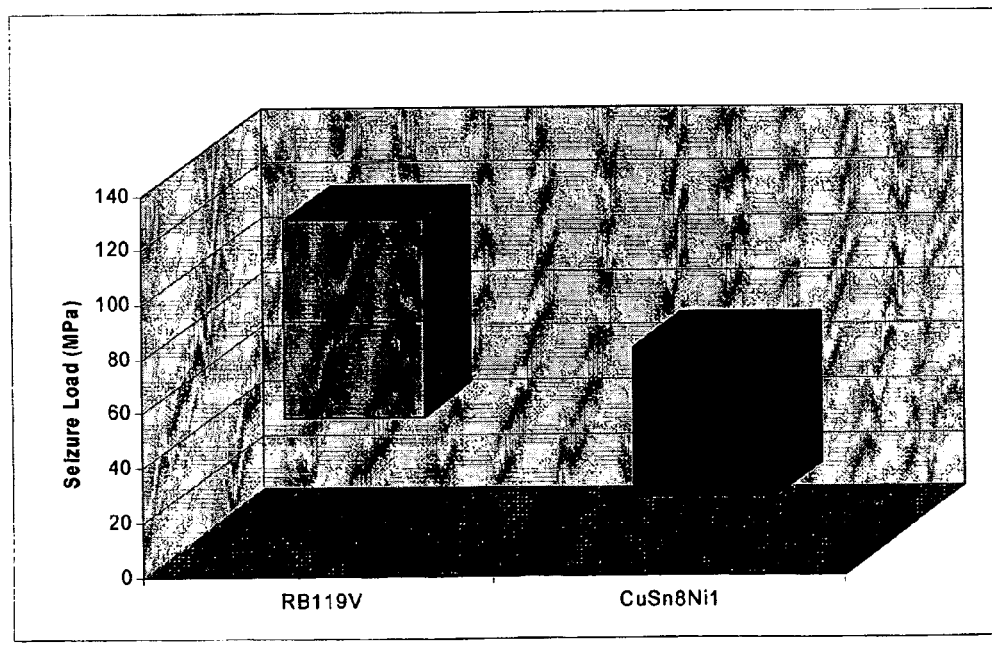

In order that the present invention may be more fully understood examples will now be described by way of illustration only with reference to the accompanying drawings, of which:

FIG. 1 shows a histogram of lubricated wear test results for various materials produced on the test apparatus of FIG. 1; and FIG. 2 shows a histogram of seizure resistance test results carried out on a known Sapphire type fatigue and seizure resistance measuring test apparatus. Test material comprising steel backed bearings were made having a lining of the copper-based alloy according to the present invention. Comparative test materials having linings currently in use for rocker bush applications in internal combustion engines were also produced according to production processes normally employed and well known in themselves. The comparative test materials comprised: copper-10 tin-10 lead; and copper-8 tin-1 nickel.

Test material according to the present invention was produced by the following process. An atomised copper-tin-nickel powder having substantially spherical particles and a nominal composition in weight % comprising Cu-8Sn-1Ni apart from incidental impurities was mixed with 3 wt % of bismuth powder and 0.05 wt % of fused alumina powder in a rotating mixer.

The resulting mixed powder was spread onto the surface of a steel strip of suitable thickness and initially sintered in a first sintering step by means of induction sintering under an atmosphere of 22% hydrogen in nitrogen. The sintered bimetal material was size rolled to such a degree that there was a degree of stretch on the steel equivalent to between 4 and 12% (depending on the steel type and thickness). This was done in order to consolidate the copper-based bearing alloy material and remove the porosity remaining from the first sintering operation. The material was then subjected to a second sintering step in a conventional gas heated sintering furnace at a temperature of 850° C. under an atmosphere of 33% hydrogen in nitrogen.

The structure of the resulting bearing material layer showed the bismuth phase to be well distributed throughout the alloy with very little porosity in evidence. Because of the very low content of alumina the presence of this phase was not easily apparent from microsections of the material.

Wear tests were performed and which were intended to be an accelerated test of wear resistance appropriate to bearing bush applications such as rocker bushes and small end bushes found in internal combustion engines. The wear tests were carried out in a known "Viper" wear testing machine by running a rotating, loaded shaft of relatively smaller diameter against a test bearing of relatively larger diameter so as to produce line contact under lubricated conditions. Wear was measured by weight loss in mg/hr and test duration was for 30 to 480 minutes depending upon wear rate, the results being as set out in FIG. 1.

As may be seen from the histogram in FIG. 1 the weight of the bearing material worn from bearings having the bearing material according to the present invention (coded RB119V in FIG. 1) was very much less at 2-4 mg/hr than the comparative materials CuSn10Pb10 and CuSn8Ni1 which demonstrated wear rates of 27 and 37-66 mg/hr, respectively under the same test conditions. Whilst the bismuth addition may contribute to a limited degree in the improvement of wear resistance it is believed that the it is the small alumina addition of 0.05 wt % which is the principal cause of the improved wear resistance.

Half bearings for performing scuff seizure resistance tests were produced of a size suitable for a known "Sapphire" testing machine. Comparative tests were also carried out on the copper-8 tin-1 nickel material as mentioned above.

Reference to the histogram of FIG. 2 shows that the overall seizure resistance of the bearing material according to the present invention is greatly improved over that of the comparative material. The bearing material according to the present invention has the addition of 3 wt % bismuth and 0.05 wt % alumina compared with the comparative bearing material. It is believed that the improvement in seizure resistance is primarily due to the bismuth content which has resulted in a seizure load range of 40-115 MPa compared with a range of 10-62 MPa for the conventional material.

Thus, the alumina content has contributed to an improvement in wear rate over conventional materials and the bismuth addition has improved the seizure resistance compared with the conventional material. Importantly, the alumina addition whilst providing a great improvement in wear resistance has not caused a deterioration in seizure resistance which would have been expected at the relatively high levels of alumina which have been used in the prior art.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A bearing material comprising: in wt %: 4-12 tin; 0.1-2 nickel; 1-6 bismuth; 0.01-less than 0.10 alumina; balance copper apart from incidental impurities, wherein the alumina particle size lies in the range from 11-14 µm.

2. A bearing material according to claim 1 having a composition range in wt % comprising: 7-9 tin; 0.5-1.5 nickel; 2-5 bismuth; 0.03-0.07 alumina; balance copper apart from incidental impurities.

3. A bearing material according claim 1, wherein the composition comprises in wt %: tin 8; nickel 1; bismuth 3.3; alumina 0.05; copper balance apart from incidental impurities.

4. A bearing material according to claim 1, wherein it is lead-free apart from an incidental impurity.

5. A bearing comprising a strong backing material layer having thereon a layer of a bearing material according to claim 1.

6. A method of making a bearing according to claim 5, the method comprising the steps of:
   making a powder having a composition in wt % lying in the ranges 4-12 tin; 0.1-2 nickel; balance copper apart from incidental impurities;
   making a powder mixture comprising said copper-tin-nickel powder with bismuth powder and alumina powder to give an overall composition lying in the range in wt % of 4-12 tin; 0.1-2 nickel; 1-6 bismuth; 0.01-less than 0.1 alumina; balance copper apart from incidental impurities, wherein the alumina particle size lies in the range from 11-14 µm;
   spreading said powder mixture onto a strong backing material;
   sintering said bearing material powder mixture to the strong backing material;
   consolidating said sintered bearing material;
   resintering said consolidated bearing material; and
   forming a bearing from said resintered material.

* * * * *

UNITED STATES PATENT AND TRADEMARK OFFICE
CERTIFICATE OF CORRECTION

PATENT NO. : 8,715,385 B2  Page 1 of 1
APPLICATION NO. : 12/998740
DATED : May 6, 2014
INVENTOR(S) : Brigdeman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 165 days.

Signed and Sealed this

Twenty-ninth Day of September, 2015

Michelle K. Lee
*Director of the United States Patent and Trademark Office*